United States Patent [19]

Inaba et al.

[11] Patent Number: 4,530,636

[45] Date of Patent: Jul. 23, 1985

[54] DEVICE FOR OPERATING A HAND OF AN INDUSTRIAL ROBOT

[75] Inventors: Hajimu Inaba, Hino; Shinsuke Sakakibara, Kunitachi; Ryo Nihei, Musashino, all of Japan

[73] Assignee: Fujitsu Fanuc Limited, Tokyo, Japan

[21] Appl. No.: 387,886

[22] PCT Filed: Oct. 7, 1981

[86] PCT No.: PCT/JP81/00267
§ 371 Date: Jun. 4, 1982
§ 102(e) Date: Jun. 4, 1982

[87] PCT Pub. No.: WO82/01155
PCT Pub. Date: Apr. 15, 1982

[30] Foreign Application Priority Data

Oct. 8, 1980 [JP] Japan .................. 55-139914

[51] Int. Cl.³ .............................. B25J 15/00
[52] U.S. Cl. ................... 414/730; 414/736; 414/741; 901/17; 901/31; 901/37; 901/39; 294/88
[58] Field of Search ........... 414/5, 736, 729, 744 A, 414/751; 294/88, 118; 269/152, 155; 901/37, 17, 39

[56] References Cited

U.S. PATENT DOCUMENTS

| | | | |
|---|---|---|---|
| 2,642,307 | 6/1953 | Olson | 294/88 X |
| 3,171,549 | 3/1965 | Orloff | 294/88 X |
| 3,410,431 | 11/1968 | Vik | 294/88 X |
| 3,851,769 | 12/1974 | Noguchi et al. | 414/744 |

FOREIGN PATENT DOCUMENTS

| | | | |
|---|---|---|---|
| 2808175 | 8/1979 | Fed. Rep. of Germany | 294/88 |
| 48-11755 | 2/1973 | Japan | |
| 48-7447 | 2/1973 | Japan | |

*Primary Examiner*—Terrance L. Siemens
*Attorney, Agent, or Firm*—Armstrong, Nikaido, Marmelstein & Kubovcik

[57] ABSTRACT

A device for operating a hand of an industrial robot is so constructed that fluid pressure cylinders (43, 44) are provided as a driving mechanism of the hand (4) of the industrial robot, branch passages including a pressure-reducing valve (47) are provided in a fluid supply passage to the fluid pressure cylinders (43, 44), the supply of fluid is switched by solenoid valves (SV$_2$, SV$_3$, SV$_4$), and the switching of the solenoid valves (SV$_2$, SV$_3$, SV$_4$) is carried out in accordance with the selected grasping force which has been selected in the teaching mode of the industrial robot, whereby the grasping force of the hand can be controlled stepwisely.

2 Claims, 5 Drawing Figures

# DEVICE FOR OPERATING A HAND OF AN INDUSTRIAL ROBOT

DESCRIPTION

TECHNICAL FIELD

The present invention relates to a device for operating a hand of an industrial robot. More particularly, it relates to a device for operating a hand of an industrial robot whose grasping force can be controlled stepwisely.

BACKGROUND ART

As a device for operating a hand of an industrial robot, there has heretofore been used one in which, as illustrated in FIG. 1, an air cylinder is driven by a fixed pneumatic pressure so as to generate the grasping force of the hand.

In the device for operating the hand of the industrial robot as shown in FIG. 1, a finger-driving mechanism 1 is so constructed as to open or close the finger portions 11 and 12 in accordance with the movement of the piston 31 of the air cylinder 3. Accordingly, the force with which the finger portions 11 and 12 grasp an article to be gripped 2 is determined by the thrust F of the air cylinder 3. This thrust F is given by the following expression:

$$F = S \cdot P \cdot \eta$$

Here, S donotes the pressure-receiving area of the piston, P the pneumatic pressure in the cylinder, and $\eta$ the efficiency.

Accordingly, the thrust F is uniquely determined by the feed pressure of the air so that the grasping force of the hand becomes constant. Therefore, in the device for operating the hand of the industrial robot as shown in FIG. 1, the article to be gripped 2 is gripped with a constant grasping force which is determined by the feed pressure of the air P. This leads to a problem in which the grasping force cannot be switched in accordance with the state of the article to be gripped, and in some cases the article to be gripped is broken.

DISCLOSURE OF THE INVENTION

The principal object of the present invention is to provide a device for operating a hand of an industrial robot in which the grasping force can be controlled in accordance with the state of the object to be gripped, in view of the problem of the prior art described above and on the basis of the concept of a passage which includes a pressure-reducing valve and which branches from a fluid supply passage for a fluid pressure cylinder so as to switch fluid feed by a solenoid valve.

In accordance with the present invention, there is provided a device for operating a hand of an industrial robot, comprising fluid pressure cylinders as a driving mechanism of the hand of the industrial robot, branch passages including pressure-reducing valves being provided in a fluid supply passage to said fluid pressure cylinder, the supply of fluid being switched by solenoid valves, the switching of said solenoid valves being carried out in accordance with the grasping force which has been selected in a teaching mode of said industrial robot, whereby the grasping force of said hand is adapted so that it can be controlled stepwisely.

BEST MODE FOR CARRYING OUT THE INVENTION

Figure 1:
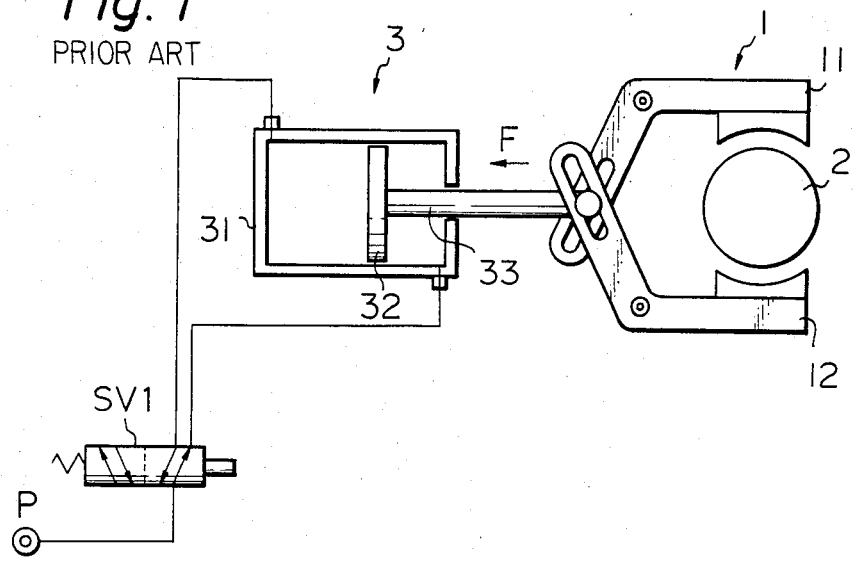
FIG. 1 illustrates a driving mechanism for the hand of an industrial robot of a prior-art.
Figure 3:
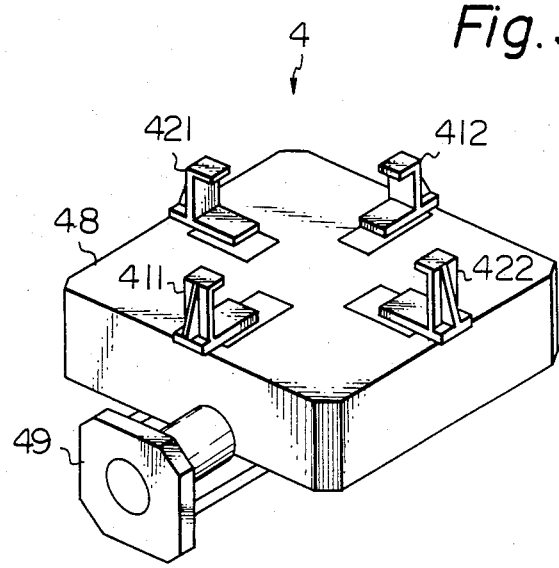
FIG. 3 illustrates an external view of the hand of the industrial robot of FIG. 2.
Figure 2:
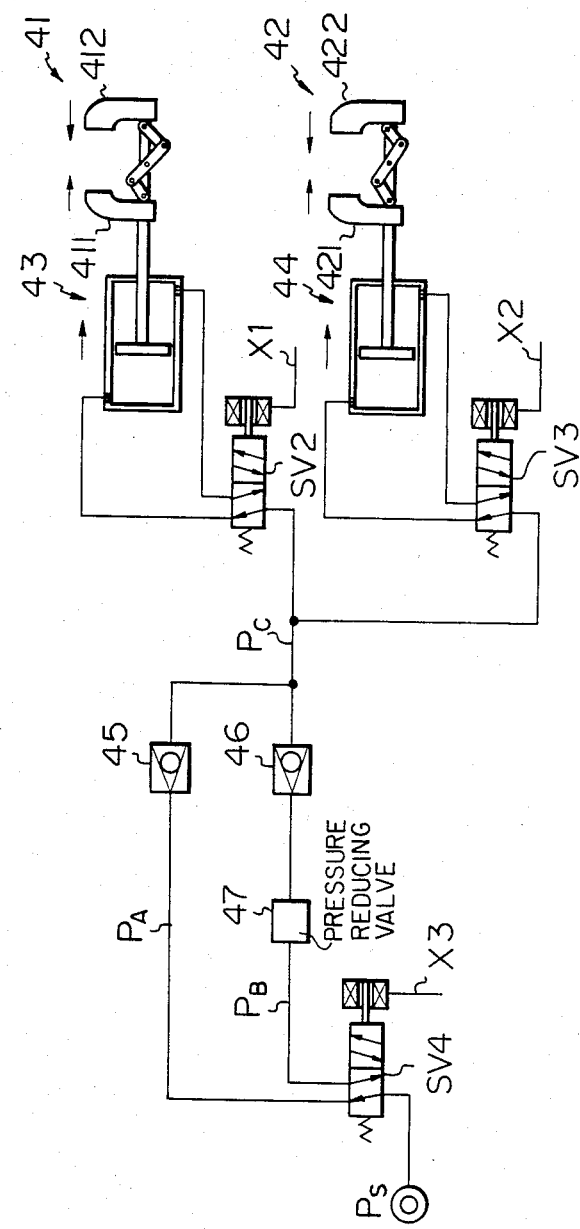
FIG. 2 illustrates a diagram of the drive flow of a device for operating a hand of an industrial robot in accordance with an embodiment of the present invention.
Figure 4:
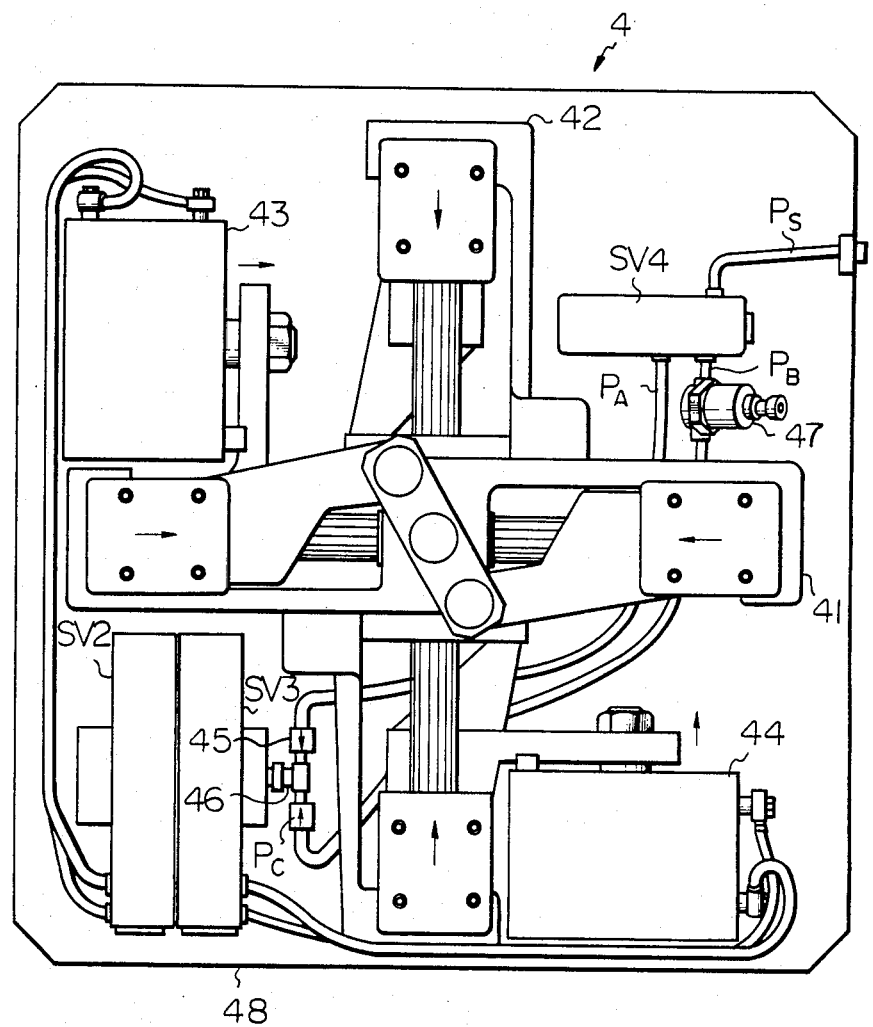
FIG. 4 illustrates the arrangement of the interior of the hand of FIG. 3.

A device for operating a hand of an industrial robot in accordance with an embodiment of the present invention is illustrated in FIGS. 2, 3 and 4. In FIG. 2, the control flow of a hand 4 according to the present invention is illustrated. An external view of the hand 4 is illustrated in FIG. 3, and the interior mechanism of the hand 4 is shown in FIG. 4. As illustrated in FIGS. 2 and 3, the hand 4 has two sets of finger mechanisms 41 and 42 which are, respectively, driven forward and backward and rightward and leftward. The finger mechanisms 41 and 42 are, respectively, driven by air cylinders 43 and 44. When the piston of the air cylinder 43 is driven in the direction of the arrow as indicated in FIG. 2, the finger mechanism 41 is closed, and when the piston of the air cylinder 43 is driven in the direction opposite to the arrow, the finger mechanism 41 is opened. The drive direction of the air cylinder 43 is controlled by a solenoid valve $SV_2$, whereby opening and closing of the finger mechanism 41 is controlled. The operation of the finger mechanism 42 is similar to the above, and the opening and closing of the finger mechanism 42 is controlled by a solenoid valve $SV_3$. Switching of the solenoid valves $SV_2$ and $SV_3$, respectively, is controlled by electric signals $X_1$ and $X_2$.

The solenoid valves $SV_2$ and $SV_3$ are fed air through a common air passage $P_C$. Two channels of air passages $P_A$ and $P_B$ are branched from an air supply source $P_S$ through a solenoid valve $SV_4$ and are connected to the air passage $P_C$. The air passage $P_A$ is provided with a check valve 45, and the air passage $P_B$ is provided with a pressure-reducing valve 47 and a check valve 46. In the solenoid valve $SV_4$, the air passage $P_A$ or $P_B$ is selected as the air passage to be connected to the air supply source $P_S$. The air passage which is not connected to the air supply source $P_S$ is opened on the atmosphere side. First, assuming that the air passage $P_A$ is connected to the air supply source $P_S$, the air is fed to the air passage $P_C$ through the solenoid valve $SV_4$ as well as the check valve 45. Further, it is fed to the air cylinder 43 through the solenoid valve $SV_2$ and to the air cylinder 44 through the solenoid valve $SV_3$. The counter flow of the air from the air passage $P_C$ to the air passage $P_B$ is prevented by the check valve 46. In this case, a pneumatic pressure $P_1$ in the air supply source is fed to the air cylinders 43 and 44 through the air passages $P_A$ and $P_C$ and the solenoid valves $SV_2$ and $SV_3$. Secondary, assuming that the air passage $P_B$ is connected to the air supply source $P_S$, the air is fed to the air passage $P_C$ through the pressure-reducing valve 47 as well as the check valve 46. Further, it is fed to the air cylinder 43 through the solenoid valve $SV_2$ and to the air cylinder 44 through the solenoid valve $SV_3$. The counter flow of the air from the air passage $P_C$ to the air passage $P_A$ is prevented by the check valve 45. Supposing that a pneumatic pressure $P_2$ lower than $P_1$ is present in the pressure-reducing valve 47, the pneumatic pressure which is fed to the air cylinders 43 and 44 is this pressure $P_2$. Accordingly, the pneumatic pressure of the air to be fed to the air cylinders 43 and 44 is switched between the two values $P_1$ and $P_2$ by the solenoid valve $SV_4$. Thus, the grasping force in each finger mechanism of the hand to be driven by the air cylinder is switched between the following two values:

$$F_1 = P_1 \cdot S \cdot \eta$$

$$F_2 = P_2 \cdot S \cdot \eta$$

Here, $P_1$ and $P_2$ denote the pneumatic pressures, S the pressure-receiving area of the air cylinder, and $\eta$ the efficiency.

The switching of the pneumatic pressures is controlled by an electric signal $X_3$ which is applied to the solenoid valve $SV_4$.

The aforementioned finger mechanisms 41 and 42, air cylinders 43 and 44, check valves 45 and 46, solenoid valves $SV_2$, $SV_3$ and $SV_4$, air passages $P_S$, $P_A$ and $P_C$, etc. are received within the casing 48 of the hand 4 as shown in FIG. 4.

Figure 5:
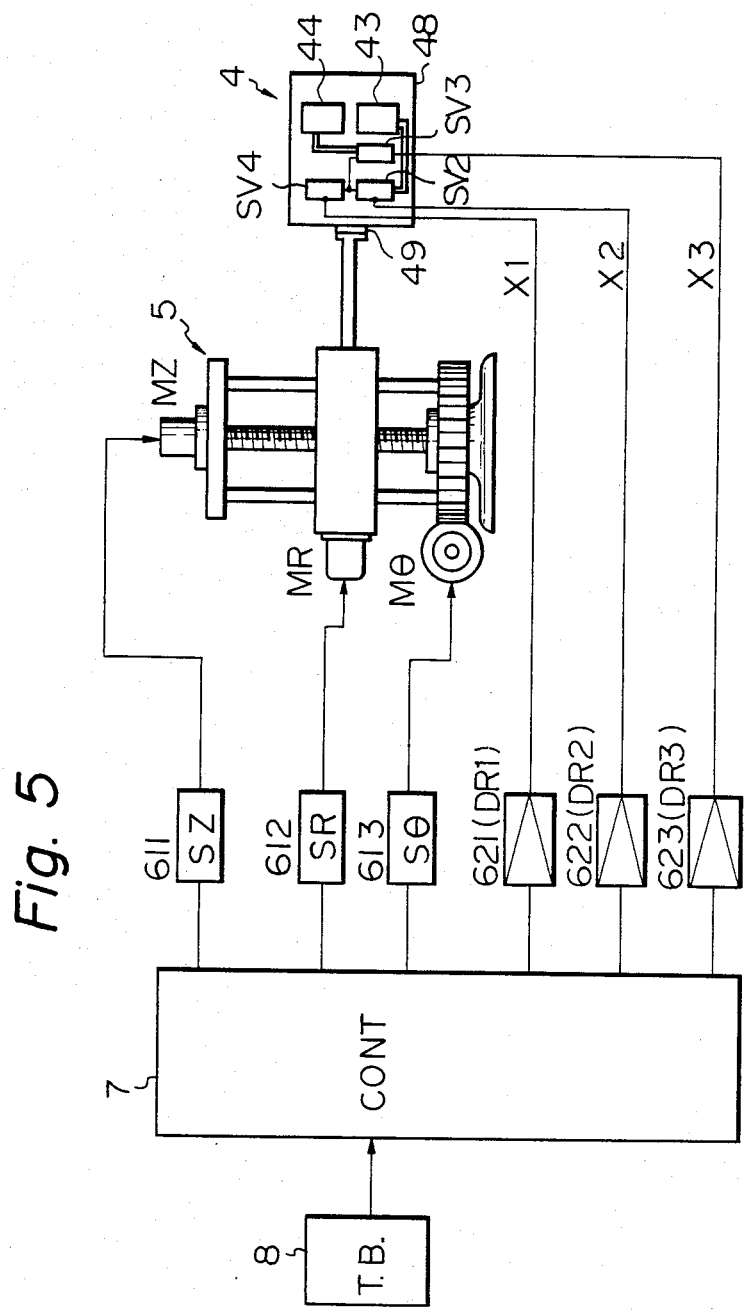
FIG. 5 illustrates a control-flow diagram of an industrial robot having the hand of FIG. 2.

In FIG. 5, an industrial robot 5 having the hand 4 shown in FIGS. 3 and 4 and the control flow thereof are illustrated. The industrial robot 5 is controlled by a robot control device (CONT) 7. In accordance with a teaching mode previously set in a teaching box (T. B.) 8, the robot control device 7 controls the position of the hand 4 in accordance with a standard cylindrical coordinate system in which Z represents altitude, $\theta$ represents the angle from a predetermined position in a plane perpendicular to the altitude and R represents the radial distance from a given central axis and control device 7 also controls the operations of the solenoid valves $SV_2$, $SV_3$ and $SV_4$ disposed in the hand 4, whereby not only opening and closing of the finger mechanisms 41 and 42 of the hand 4 but also switching of the grasping force can be controlled. Accordingly, the grasping force of the hand 4 can be preset in the teaching mode of the teaching box 8, depending upon the kind and state of the article to be gripped by the hand 4.

While in the hand 4 shown in FIG. 2 the grasping force thereof is switched between the two values, it can of course be set so as to be switched in three or more stages if necessary.

In addition, while the above-mentioned embodiment has been described as employing air as the pressure medium, it is also possible to employ a different fluid.

According to the present invention, there can be provided a device for operating a hand of an industrial robot in which the grasping force can be controlled depending upon the state of the article to be gripped.

We claim:

1. A device for operating a hand of an industrial robot, comprising:
   a first set of finger mechanisms having means for movement in a direction X;
   a second set of finger mechanisms having means for movement in a direction Y, generally perpendicular to the direction X;
   first and second hydraulic cylinders for driving said movement means of said first and second sets of finger mechanisms, respectively;
   first and second hydraulic fluid passages for supplying hydraulic fluid to said first and second hydraulic cylinders through first and second solenoid valves, respectively;
   parallel main and branch passages for alternately supplying hydraulic fluid to said first and second hydraulic fluid passages;
   a third solenoid valve for controlling the supply of fluid between said main and branch fluid passages and said branch passage having a pressure reducing valve;
   a fluid supply source for supplying the fluid with a constant pressure to said third solenoid valve;
   means for supplying electrical signals to said first, second, and third solenoid valves; and
   teaching means for independently controlling the movement of said first and second sets of finger mechanisms, such that the grasping force of said finger mechanisms is incrementally controlled by said teaching means.

2. A device for operating a hand of an industrial robot as defined in claim 1, wherein said teaching means comprises:
   a teaching box;
   a robot-controlling means receiving a signal from said teaching box;
   Z-, $\theta$-, and R-motion-driving circuits receiving motor-driving signals from said robot cotnrol device;
   motors for driving Z-, $\theta$-, and R-motions of said industrial robot wherein said Z, $\theta$ and R motions correspond to altitude, angle from a set position in a plane perpendicular to said altitude and a radial distance from a given central axis, respectively, and said motors receive the output signals of said Z-, $\theta$-, and R-motion-driving circuits;
   first, second, and third solenoid valve-driving circuits receiving solenoid valve-driving signals from said robot-controlling means; and
   means for conveying the outputs from said first, second and third solenoid valve-driving circuits to said first, second and third solenoid valves, respectively.

* * * * *